United States Patent
Keck et al.

(10) Patent No.: US 8,932,117 B1
(45) Date of Patent: Jan. 13, 2015

(54) POULTRY EUTHANASIA DEVICE

(71) Applicants: Lloyd Keck, West Fork, AR (US); Harley Prater, Jr., Prairie Grove, AR (US)

(72) Inventors: Lloyd Keck, West Fork, AR (US); Harley Prater, Jr., Prairie Grove, AR (US)

( * ) Notice: Subject to any disclaimer, the term of this patent is extended or adjusted under 35 U.S.C. 154(b) by 0 days.

(21) Appl. No.: 14/026,576

(22) Filed: Sep. 13, 2013

Related U.S. Application Data

(60) Provisional application No. 61/700,577, filed on Sep. 13, 2012.

(51) Int. Cl.
*A22B 1/00* (2006.01)
*A22B 3/08* (2006.01)
*A22B 3/02* (2006.01)

(52) U.S. Cl.
CPC .... *A22B 3/08* (2013.01); *A22B 3/02* (2013.01)
USPC .......................................................... 452/54

(58) Field of Classification Search
USPC ................. 452/54, 57–62, 102, 103
See application file for complete search history.

(56) References Cited

U.S. PATENT DOCUMENTS

| | | | |
|---|---|---|---|
| 549,008 A | 10/1895 | Olson | |
| 1,090,317 A | 3/1914 | Lindstrom | |
| 1,389,784 A | 9/1921 | Rece et al. | |
| 1,427,562 A | 8/1922 | Suther | |
| 1,474,711 A | 11/1923 | Haas | |
| 1,503,372 A * | 7/1924 | Pacholke | 452/61 |
| 1,575,832 A | 3/1926 | Higman | |
| 1,668,432 A * | 5/1928 | Thorstenson | 42/2 |
| 2,434,587 A * | 1/1948 | Balliet | 452/65 |
| 2,536,336 A * | 1/1951 | Watson | 452/61 |
| 2,555,701 A * | 6/1951 | Ott et al. | 600/244 |
| 3,258,811 A * | 7/1966 | Braun | 452/60 |
| 3,686,713 A | 8/1972 | Lewis | 17/52 |
| 4,730,365 A | 3/1988 | Simmons | 17/12 |
| 4,894,885 A | 1/1990 | Markert | 17/11 |
| 5,290,186 A | 3/1994 | Juranitch | 452/149 |
| 7,909,682 B1 * | 3/2011 | Goodman | 452/6 |
| 8,152,605 B1 | 4/2012 | Koechner et al. | 452/52 |
| 8,216,031 B2 | 7/2012 | Kleinsasser | 452/52 |
| 2010/0105305 A1 | 4/2010 | Pizzurro | 452/52 |

* cited by examiner

*Primary Examiner* — Richard Price, Jr.
(74) *Attorney, Agent, or Firm* — Keisling & Pieper PLC; Trent C. Keisling

(57) ABSTRACT

A method and apparatus for euthanizing poultry by rapidly impacting the spinal column of the bird.

19 Claims, 4 Drawing Sheets

POULTRY EUTHANASIA DEVICE

CROSS-REFERENCE TO RELATED APPLICATIONS

This application claims priority to and is a continuation of U.S. provisional application Ser. No. 61/700,577 filed on Sep. 13, 2012, which is hereby expressly incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates generally to improvements for euthanasia of poultry. In particular, the invention relates to a tool configured to humanely and quickly euthanize poultry.

Known art in various other types of euthanasia devices may be found in U.S. Class 452, Butchering, Subclass 52 Slaughtering as well as in other classes and subclasses.

In many situations it is necessary to euthanize domestic birds such as chickens, ducks, turkeys and geese at the end of their useful life or in the event of a health epidemic. One example where a few birds are required to be euthanized, such as to prevent disease contamination of the whole flock or in the case of a broken bone.

Several United States patents should be considered to understand euthanasia devices. These include devices for crushing the neck to effectively euthanize the animal, such as U.S. Pat. No. 8,216,031, issued to Kleinsasser on Jul. 10, 2012; U.S. Pat. No. 8,152,605, issued to Koechner et al. on Apr. 10, 2012; U.S. Patent Publication No. 2010/0105305, filed by Pizzurro on Oct. 27, 2009; and U.S. Pat. No. 4,730,365, issued to Simmons on Mar. 15, 1988. Others include devices for cutting the neck of the animal, such as U.S. Pat. No. 5,290,186, issued to Juranitch on Mar. 1, 1994; U.S. Pat. No. 4,894,885, issued to Markert on Jan. 23, 1990; U.S. Pat. No. 3,686,713, issued to Lewis on Aug. 29, 1972; U.S. Pat. No. 1,575,832, issued to Higman on Mar. 9, 1926; U.S. Pat. No. 1,503,372, issued to Pacholke on Jul. 29, 1924; U.S. Pat. No. 1,474,711, issued to Haas on Nov. 20, 1923; U.S. Pat. No. 1,427,562, issued to Suther on Aug. 29, 1922; U.S. Pat. No. 1,389,784, issued to Rece et al. on Sep. 6, 1921; U.S. Pat. No. 1,090,317, issued to Lindstrom on Mar. 17, 1914; and U.S. Pat. No. 549,008, issued to Olson on Oct. 29, 1895. Each of these patents and/or applications are hereby expressly incorporated by reference in their entirety.

U.S. Pat. No. 8,216,031, issued to Kleinsasser on Jul. 10, 2012 entitled Euthanasia of Poultry teaches a tool on the neck of the bird and crushing the neck between two co-operating members each having a front face for engaging the neck which is sufficiently blunt to prevent cutting of the skin of the neck during the crushing action so as to prevent escape of blood from the neck with the members being held separated at an end of the crushing action to prevent severing of the neck. The members can be driven together for example by hand pressure or on a frame by a foot lever or can be provided as a pair of counter-rotating wheels. However, the structure of the device of Kleinsasser requires upper body strength to operate the device. Thus, there is a need for a device that can be utilized without excessive body strength.

U.S. Pat. No. 8,152,605, issued to Koechner et al. on Apr. 10, 2012 entitled Handheld Cervical Dislocator teaches a handheld cervical dislocator that will encircle the neck of poultry of most any size and dislocate the neck vertebrae from the skull immediately to terminate the life of culled poultry with minimum discomfort. However, the structure of the device of Koechner et al. requires upper body strength and two hands to operate the device. Thus, there is a need for a device that can be utilized with one hand without excessive body strength.

U.S. Patent Publication No. 2010/0105305, filed by Pizzurro on Oct. 27, 2009 entitled Rabbit and Poultry Cervical Vertebral Dislocation Apparatus teaches a cylindrical rod attached to an L-shaped base frame and mounting flange. The apparatus is mounted to a solid rigid structure by appropriate means. A fixed rod and base frame forming an inverted wedge to receive the animal's neck into the apparatus. With the animals head wedged between the rod and the base frame, the operator holds the animal by the back legs or feet and pulls upward and back thus separating the skull from the spine humanely and instantly stunning and killing the animal by causing irreparable damage to the brain stem, spinal cord, arteries and spine. The animal is stunned by the trauma and dies as a result of the brain being separated from the rest of the body and massive internal bleeding. However, the device of Pizzurro requires a sudden amount of force to operate the device. This sudden energy use can be difficult to apply when also handling an animal. Thus, there is a need for a device that can be utilized which uses stored energy to euthanize the animal.

U.S. Pat. No. 4,730,365, issued to Simmons on Mar. 15, 1988 entitled Poultry Neck Breaker Assembly teaches a neck breaking assembly for a poultry processing operation wherein the bird's neck is first aligned and positioned into an identifiable location adjacent to a breaker block. The breaker block is then projected towards the bird breaking the neck of the bird against a V-shaped aligning and positioning assembly which serves as an anvil for the breaker block. The projected breaker block is then withdrawn downwardly separating the severed neck from the bird and stretching the remaining neck skin. However, the Simmons device is a stationary device, which limits the use to a set location. In certain situations, it is necessary to quickly euthanize the bird and carrying it to the predetermined spot to euthanize may take time. Thus, a portable euthanasia device is needed.

The American Veterinary Medical Association (AVMA) describes euthanasia as "rapid loss of consciousness followed by cardiac or respiratory arrest and the ultimate loss of brain function." (2000 Report of the AVMA panel on euthanasia. JAVMA 218(5): 669-698. The AVMA requires that the animal(s) to be euthanized experience minimal distress before being rendered unconscious. There are a number of currently accepted methods for euthanizing poultry include inhalation agents, non-penetrating captive bolt, cervical dislocation, percussive blow, decapitation, maceration, and electrocution. The methods cause death by (1) direct or indirect hypoxia, (2) direct depression of neurons and/or (3) physical disruption of brain activity. Extensive guidelines exist for euthanasia of poultry for processing prior to marketing. However, during emergencies such as a disease outbreak, there are fewer options. The 2000 Report of the AVMA Panel on Euthanasia, devotes only one paragraph on mass euthanasia and states "under unusual conditions, such as disease eradication and natural disasters, euthanasia options may be limited. In these situations, the most appropriate technique that minimizes human and animal health concerns must be used."

SUMMARY OF THE INVENTION

In accordance with an embodiment of the present invention, a method and apparatus for killing fowl is presented having all of the advantages of similarly employed prior art methods and devices with none of the above described disadvantages. In order to obtain this, the present invention provides a unique method for killing fowl which comprises breaking the spinal cord of the fowl and concurrently delivering blunt force trauma causing unconsciousness and rapid death. In order to utilize this technique with speed and precision, the present invention also provides an apparatus utilizing stored energy.

Accordingly, an object of the present invention is to provide a method for killing fowl by breaking the spinal cord, thereby causing rapid death.

It is another object of this invention to provide a method for killing fowl without severing the jugular veins of the bird.

Another object of this invention is to provide a method of killing fowl which is sufficiently rapid and precise to be used a humane method of euthanasia.

The foregoing and other objects are obtained in accordance with the present invention by a method for euthanizing poultry which comprises restraining the neck of the fowl within an open channel and releasing a bolt through the channel to rapidly apply pressure These objects and other objects and advantages of the invention will be apparent from the following description.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
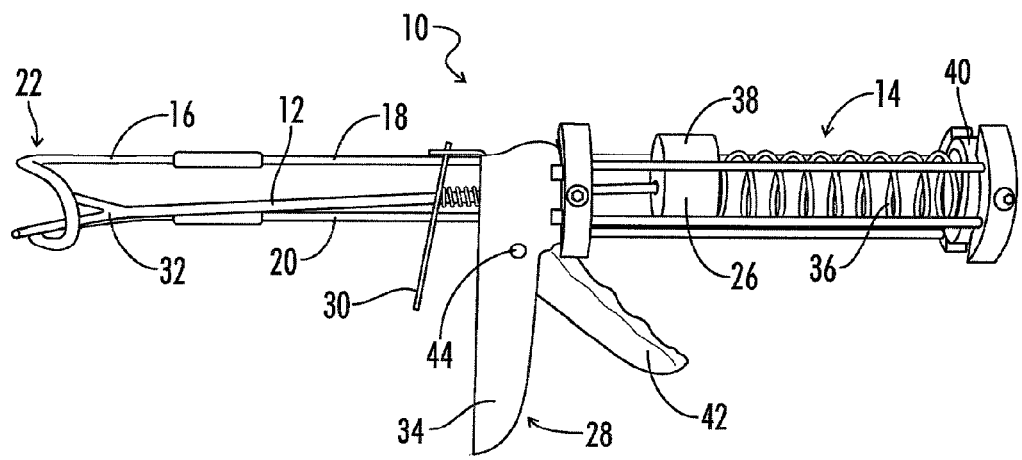
FIG. 1 is a right side elevational view of the euthanasia device in its deployed state.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The invention relates to a euthanasia device for humanely euthanizing poultry or small mammals. The term poultry or bird will hereinafter be referred to for convenience but without limitation as the animal being euthanized although those of skill in the art will appreciate that other animals may be euthanized using the present invention. It has been found in accordance with the present invention that fowl such as chickens may be slaughtered through a sharp, instant impact to the spinal cord at the base of the skull of the fowl. A particularly suitable apparatus for carrying out this technique in poultry processing comprises a piston operating a fork-shaped rod for impacting the spinal column below the head of the fowl.

Figure 3:
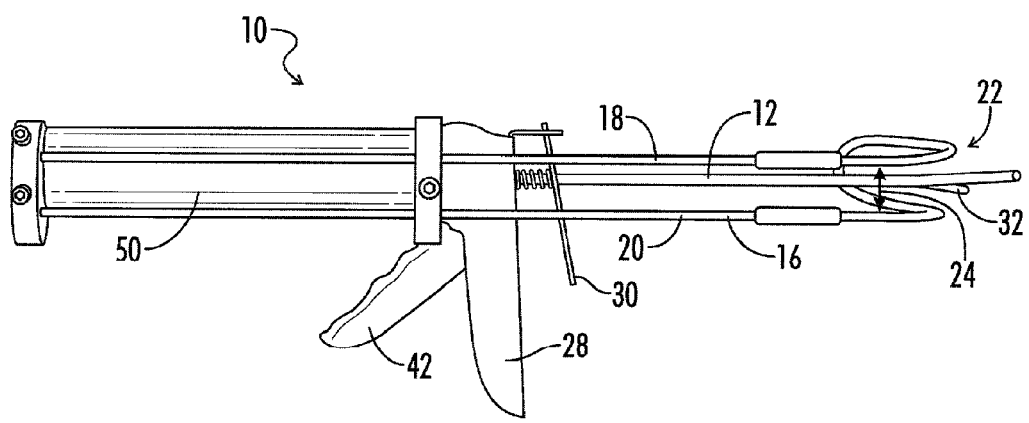
FIG. 3 is a left side elevational view of the euthanasia device in its deployed state.
Figure 4:
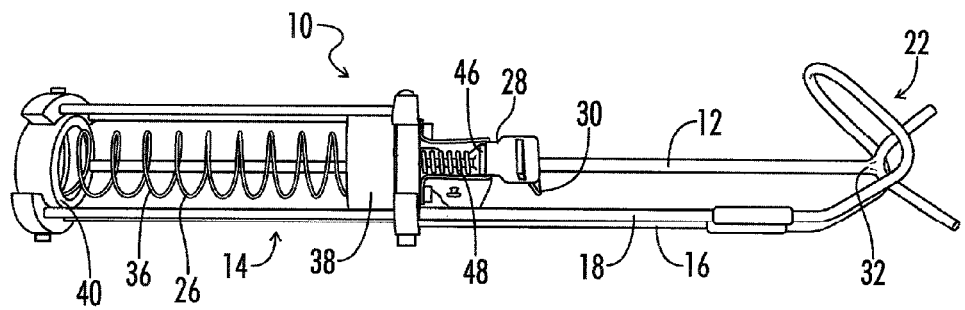
FIG. 4 is a top plan view thereof.
Figure 5:
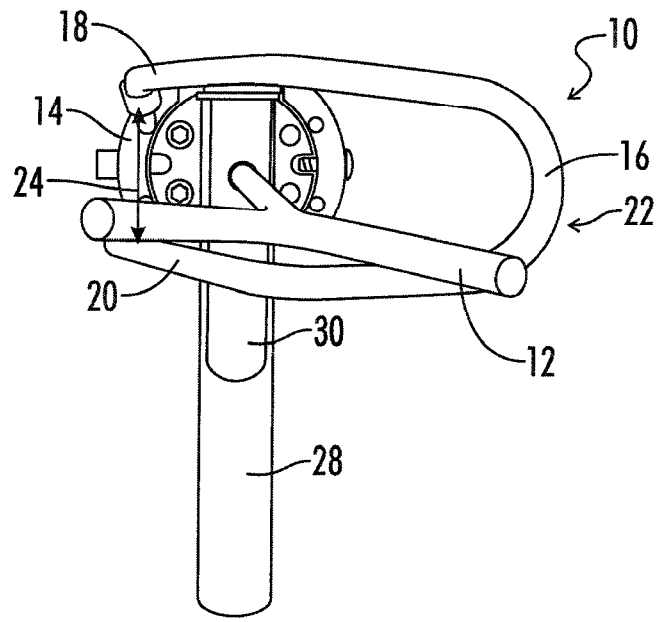
FIG. 5 is a front elevational view thereof.

Referring now to FIG. 1, the euthanizing device 10 of the present invention includes a restraining hook 16 containing a forked rod 12 affixed to a cylinder 14. As shown in the drawings, cylinder 14 is open to allow for the internal mechanism to be viewed. However, it is envisioned that cylinder 14 will include an exterior housing 50 (shown in FIG. 3) to cover the mechanism.

The restraining hook 16 is formed by two parallel rods 18, 20 running from the front of the cylinder 14 along the longitudinal axis of the device 10 to a point distal from the cylinder 14 where the parallel rods curve to form a hook structure 22. At the end of the hook 22, the parallel rods 18, 20 curve inward to join. The channel 24 formed between both parallel rods 18, 20 allows the forked rod 12 to move unimpeded along the restraining hook 16 and guide the movement of the forked rod 12. The parallel rods 18, 20 may also extend through the cylinder 14 to provide support for the cylinder. The head of the bird is placed at the end of the restraining hook 16 when the forked rod 12 is in its retracted position.

The forked rod 12 is connected to a piston 26 housed within cylinder 14. The forked rod 12 passes through a suitable hole in a cylinder 14 and through a rod retractor 28 and a rod deployer 30. The forked rod 12 has two forked rods at the distal 32 end of the forked rod for impacting around the neck of the bird.

The cylinder 14 houses a biasing piston 26 connected to the forked rod 12. The biasing piston 26 includes a first end 38 with an opposing second end 40 and a helical compression spring 36 between the first opposing end 38 and the second opposing end 40. The forked rod 12 is connected to the first opposing end 38 and is motivated rearward along the longitudinal axis of the device 10 into a retracted position when the first opposing end 38 is moved to compress the compression spring 36. Likewise, when the compression spring is released, motivating the first opposing end 38 forward, the forked rod 12 is motivated forward into the deployed position. The force of the compression spring 38 release is sufficient to rapidly propel the forked rod 12 along the channel 24 to impact the spinal cord of any restrained bird.

Figure 2:
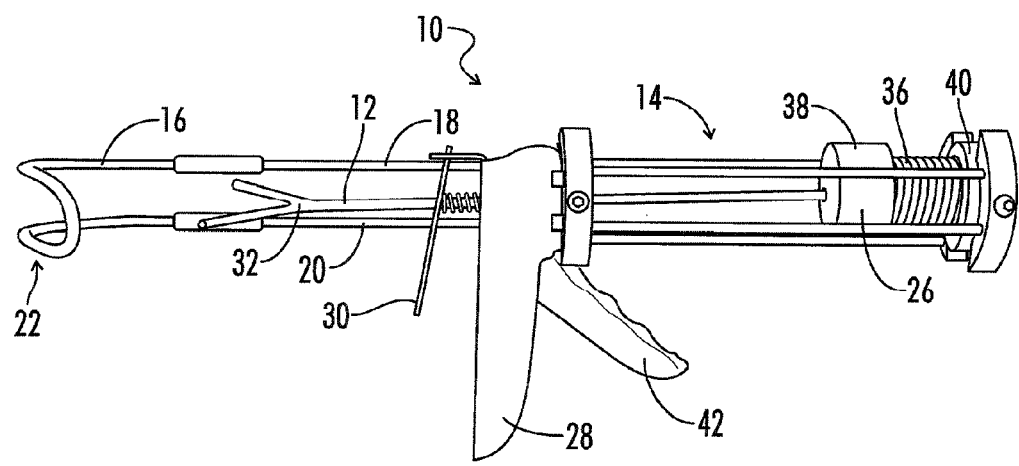
FIG. 2 is a right side elevational view of the euthanasia device in its retracted state.
Figure 6:
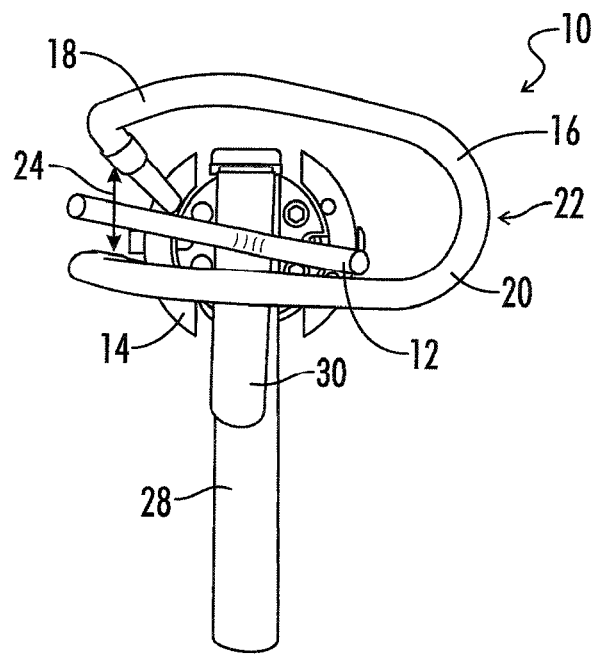
FIG. 6 is a front elevational view of the euthanasia device in its retracted state.

The compression spring 36 of the biasing piston 26 is compressed to move the rod 12 into the retracted position through hand manipulation of the retractor 28. For convenient handling, the euthanizing device is provided with a suitable grip handle 34 as part of the retractor 28. The grip handle extends upwards to the top of the device and includes a front face opposite the front end of cylinder 14. The forked rod 12 passes through the front face of the handle through the front face of the cylinder 14. A piston biasing spring 48 surrounds the rod 12 between a biasing mechanism 46 along the front face of the grip handle and the front face of the cylinder 14. The rod 12 includes a series of grooves (not shown) adapted to engage the coils of the piston biasing spring 48. In combination with the grip handle, the retractor 28 has a deploying arm 42 in a pivoting arrangement with the handle 34 and a catch mechanism (not shown) above the pivot point 44. To retract the rod 12, a user biases the ratcheting deploying arm 42 against the handle 34. The catch mechanism, resting against the biasing mechanism 46 prior to the pivoting action, then motivates the biasing mechanism 46 to compress the piston biasing spring 48. The grooves on the forked rod 12 engage with the biasing spring 48 and moves rearward into the retracted position, as shown in FIGS. 2 and 6.

Once the neck of the bird is held within the restraining hook 16 and the rod 12 is in the retracted position, the device 10 can be utilized to euthanize an animal. A user can deploy the rod by releasing the stored energy within the piston 26 by holding the grip handle 34 and biasing an activator 30, which is shown connected to the grip handle. The biasing of the activator 30 can be accomplished by one hand. Deployment of the piston forces the forked rod 12, which is affixed to the piston 26, against the neck of the bird, severing the spinal column without breaking the skin of the bird.

Figure 7:
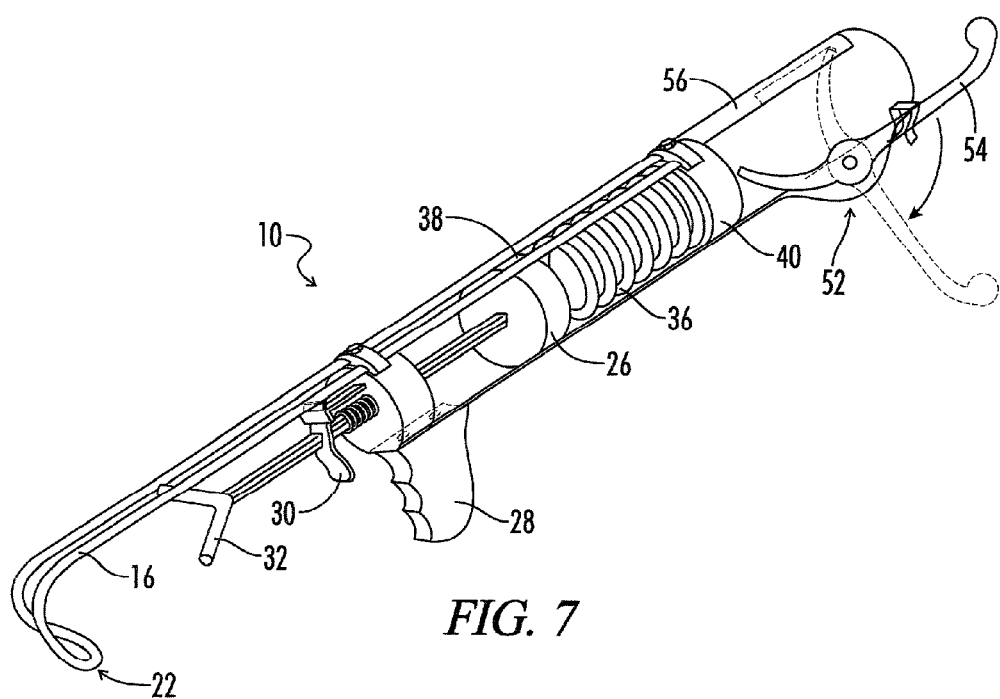
FIG. 7 is a perspective view of another embodiment of the euthanasia device.

As shown in FIG. 7, another embodiment of the present invention provides a rearward ratcheting mechanism 52 working in conjunction with the biasing piston, compression spring and forked rod. The rearward ratcheting mechanism is proximate the rear of the cylinder 14. The rearward ratcheting mechanism 52 includes a ratcheting lever 54 which is configured to move downward from the longitudinal axis of the device 10 to contact a biasing pin 56, which in turn is configured to compress the helical compression spring 36. The ratcheting lever 54 contacts the biasing pin 56 to motivate the biasing pin rearwardly along the longitudinal axis of the device. As the biasing pin 56 moves rearwardly, the first opposing end 38 of the biasing piston is and is motivated rearward along the longitudinal axis of the device 10 into a retracted position when the first opposing end 38 is moved to compress the compression spring 36. As with the first embodiment, when the compression spring is released by biasing the activator 30 in the rearward ratcheting embodiment, the first opposing end 38 moves forward and the forked rod 12 is motivated forward into the deployed position.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An apparatus for euthanizing poultry by rapidly impacting the spinal column of the bird, the apparatus comprising:
   a cylinder containing a helical compression spring and a biasing piston;
   a handle;
   at least two parallel rods extending along a longitudinal axis and terminating in a hook end;
   a cylindrical rod extending along said longitudinal axis and having a forked end whereby said rod is propelled by the release of said compression spring; and
   an activator for releasing said rod.

2. The device of claim 1, wherein said handle comprising at least one stationary grip handle and one ratcheting grip handle joined by a pivot pin.

3. The device of claim 1, wherein said forked rod is affixed to said piston positioned such that one forked arm extends into the channel provided by said hook end.

4. The device of claim 1, wherein said forked rod moves from a retracted position through and extended position into said hook end of said parallel rods.

5. The device of claim 1, wherein said biasing piston is configured to move to a first position compressing said compression spring and to a second position releasing said compression spring.

6. The device of claim 5, wherein said cylindrical rod is configured to move along said longitudinal axis from a retracted position when said biasing piston is in said first position to a deployed position when said biasing piston is in said second position, thereby impacting the spinal cord of a restrained bird.

7. The device of claim 5 further comprising a catch mechanism for holding said compression spring when it is compressed by said biasing piston.

8. An apparatus for euthanizing poultry by rapidly impacting the spinal column of the bird, the apparatus comprising:
   a cylinder containing a helical compression spring and a biasing piston;
   a handle comprising at least one stationary grip handle and one ratcheting grip handle joined by a pivot pin, said ratcheting grip configured to move said biasing piston;
   at least two parallel rods extending along a longitudinal axis and terminating in a hook end;
   a rod having a forked end extending along said longitudinal axis and having a forked end; and
   an activator for releasing said rod.

9. The device of claim 8, wherein ratcheting action of said handle applies pressure to said biasing piston such that the result is compression of the compression spring.

10. The device of claim 8, wherein ratcheting action of said handle can be achieved with a single hand.

11. The device of claim 8, wherein said activator is located in proximity to said handle as to allow for release of the activator with the same hand as is holding said ratcheting grip.

12. The device of claim 8, wherein said biasing piston is configured to move to a first position compressing said compression spring and to a second position releasing said compression spring.

13. The device of claim 12, wherein said rod is configured to move along said longitudinal axis from a retracted position when said biasing piston is in said first position to a deployed position when said biasing piston is in said second position, thereby impacting the spinal cord of a restrained bird.

14. The device of claim 12 further comprising a catch mechanism for holding said compression spring when it is compressed by said biasing piston.

15. An apparatus for euthanizing a restrained bird, the apparatus comprising:
   a cylinder containing a compression spring and a biasing piston, said biasing piston configured to move to a first position compressing said compression spring and to a second position releasing said compression spring;
   a handle comprising at least one stationary grip handle and one ratcheting grip handle, said ratcheting grip configured to move said biasing piston;
   at least one parallel rod extending along a longitudinal axis and terminating in a hook end; and
   a forked rod having a first end connected to said biasing piston, said forked rod configured to move along said longitudinal axis from a retracted position when said biasing piston is in said first position to a deployed position when said biasing piston is in said second position, thereby impacting the spinal cord of a restrained bird.

16. The apparatus of claim 15, wherein the distal end of said forked rod comprises a fixed forked cylindrical v-shaped rod to apply quick blunt pressure to the neck of the bird without lacerating the skin.

17. The apparatus of claim 15, wherein said forked rod comprises a hinged forked end comprising a locking mechanism to allow for adjustment of the v-shaped delivery mechanism to allow for customization to the species of bird to be euthanized.

18. The apparatus of claim 15, wherein a locking mechanism is affixed to said forked rod such that it does not contact the neck of the bird.

19. The apparatus of claim 15, wherein said forked rod is configured to be held in said retracted position.

* * * * *